United States Patent [19]

Zink

[11] 3,940,222

[45] Feb. 24, 1976

[54] FILTER CHANGING VALVE UNIT

[75] Inventor: Julius Zink, Yarmouth Port, Mass.

[73] Assignee: J. Zink Co., Inc., Yarmouth Port, Mass.

[22] Filed: May 23, 1974

[21] Appl. No.: 472,614

Related U.S. Application Data

[63] Continuation-in-part of Ser. No. 326,019, Jan. 23, 1973, abandoned.

[52] U.S. Cl. .................. 425/199; 210/341; 210/420
[51] Int. Cl.² ........................................... B29B 1/04
[58] Field of Search ............ 425/197, 199; 137/594, 137/595; 210/340, 341, 420

[56] References Cited

UNITED STATES PATENTS

| | | | |
|---|---|---|---|
| 1,270,722 | 6/1918 | Gillette | 137/595 |
| 1,345,364 | 7/1920 | Hausen | 137/595 |
| 1,515,080 | 11/1924 | Strachan et al. | 210/340 X |
| 1,961,083 | 5/1934 | Sherman et al. | 137/595 X |
| 3,243,849 | 4/1966 | Joukainen | 210/340 |
| 3,455,357 | 7/1969 | Zink | 425/197 X |
| 3,503,096 | 3/1970 | Marianelli | 425/199 X |
| 3,618,781 | 11/1971 | Brown | 210/341 |
| 3,679,060 | 7/1972 | Smith | 210/340 X |
| 3,833,121 | 9/1974 | Singleton et al. | 210/340 X |
| 3,896,029 | 7/1975 | Bereselinck | 210/341 |

FOREIGN PATENTS OR APPLICATIONS

| | | | |
|---|---|---|---|
| 531,745 | 10/1956 | Canada | 425/145 |
| 549,078 | 11/1922 | France | 137/595 |

Primary Examiner—Richard B. Lazarus

[57] ABSTRACT

In combination with extrusion apparatus having a liquid source, a die and alternate filter means, a continuous flow plug valve unit is provided for use in changing filters; the valve unit comprises a valve housing, plug means seated in the housing, and control means for moving the plug means with respect to the housing. Passage means in the plug means and housing overlap in all operative positions of the valve to provide an available flow passage of hydraulic flow radius everywhere at least about equal to that of the inlet from the source; the valve presents no restriction to the flow of liquid from the source.

10 Claims, 48 Drawing Figures

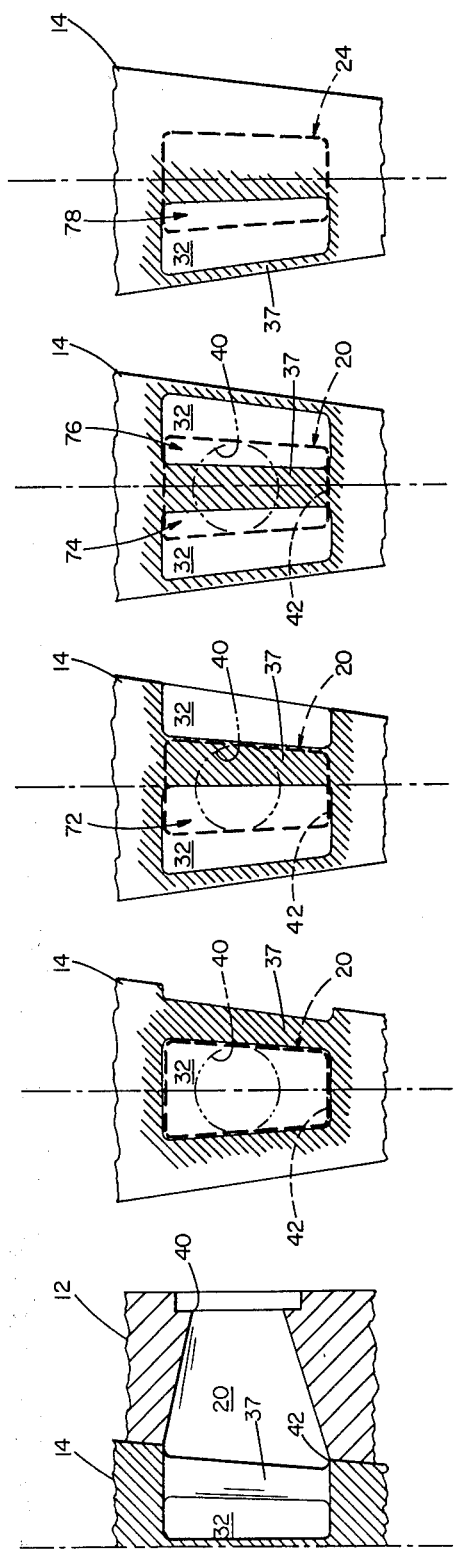

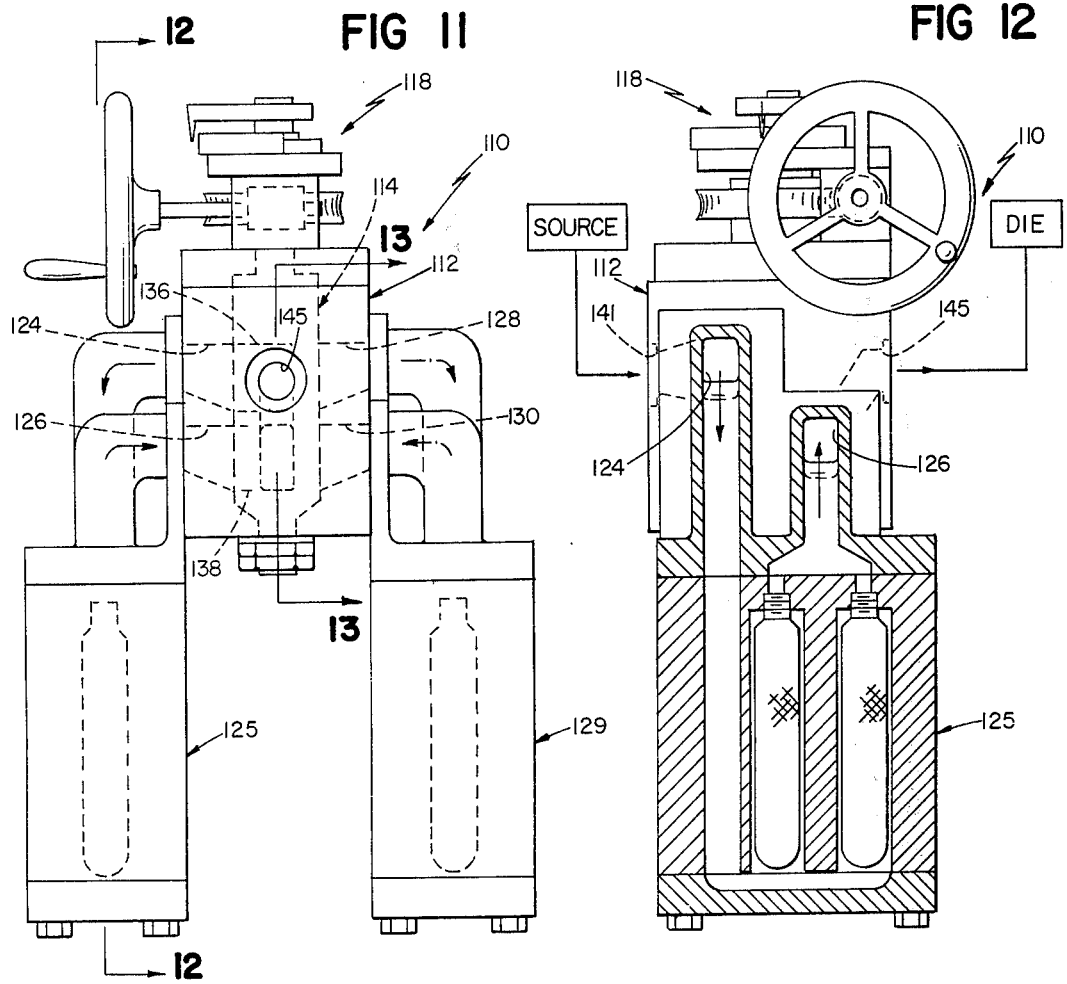
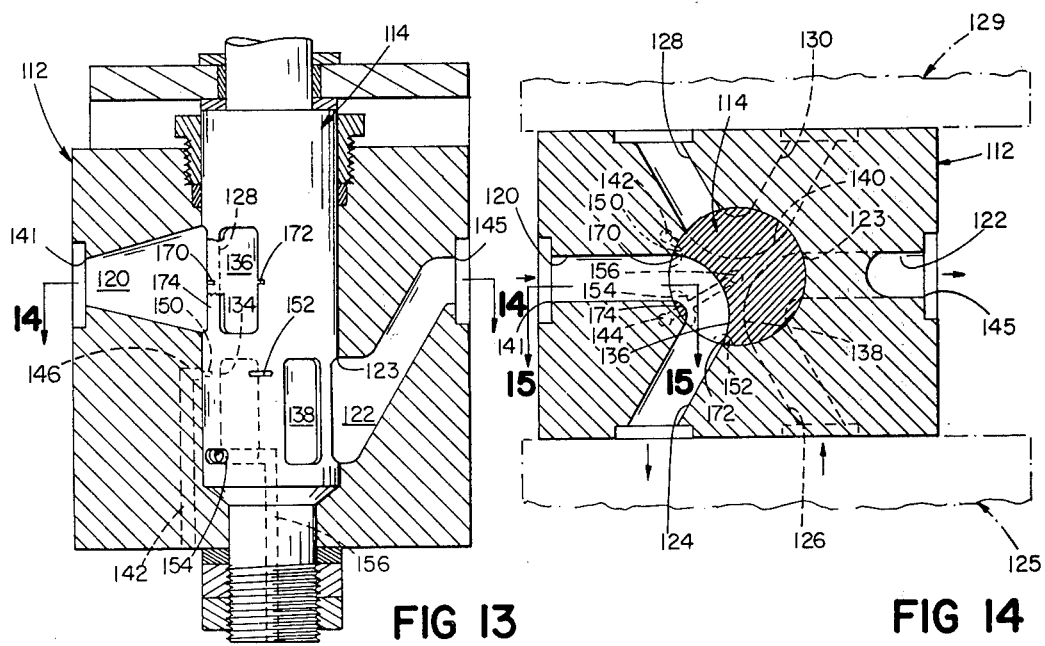

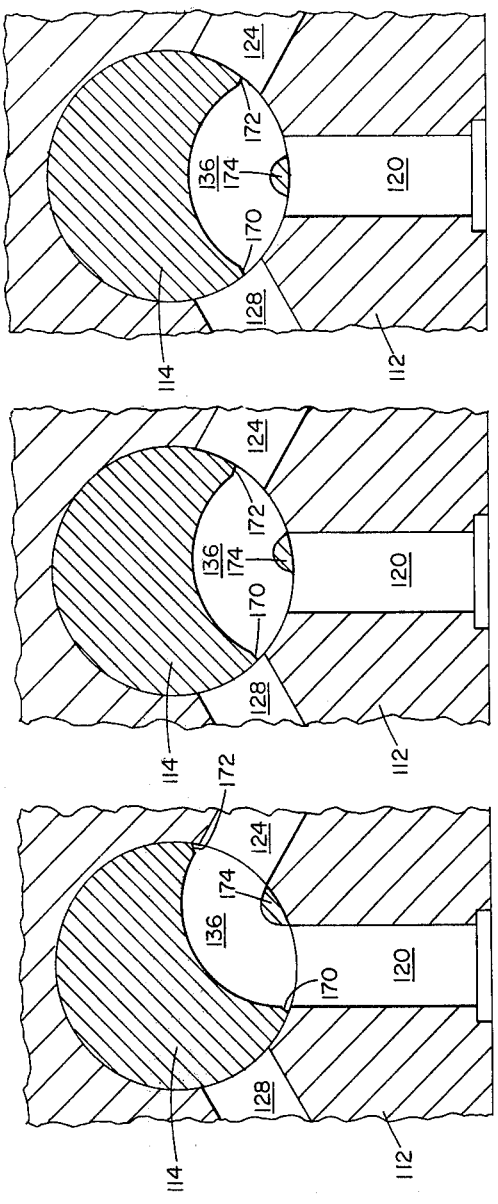
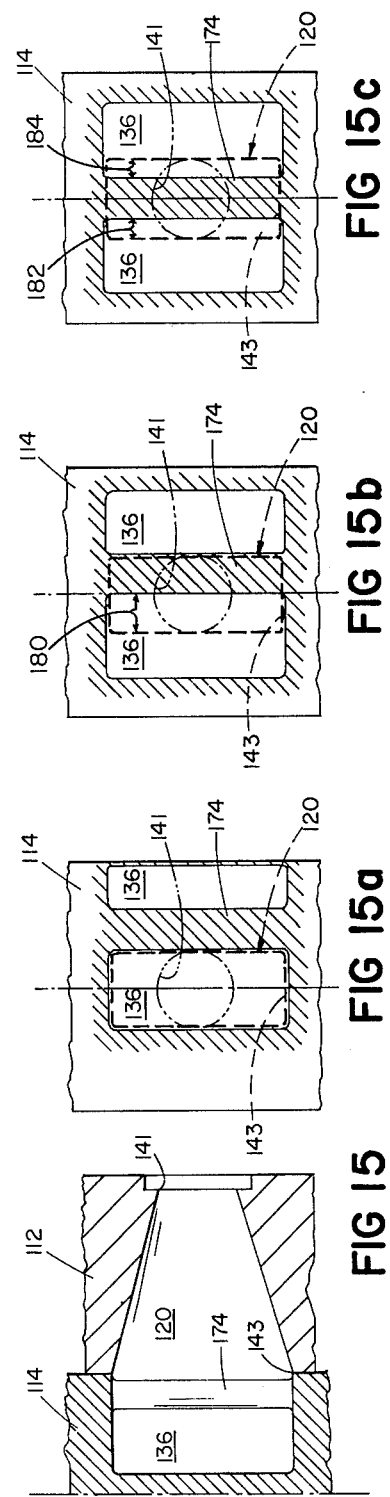

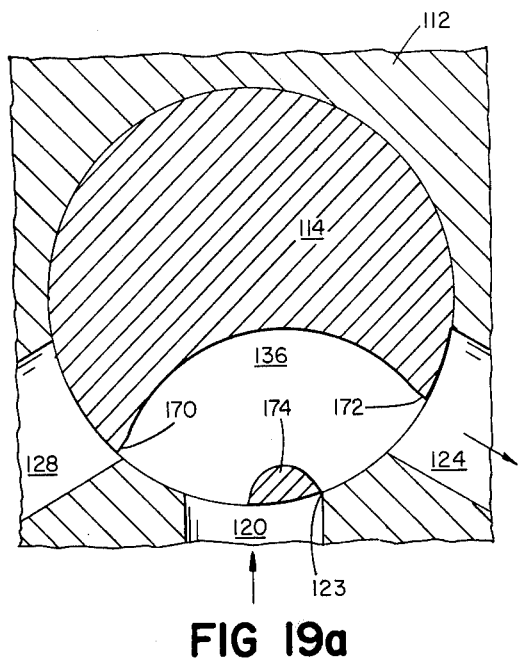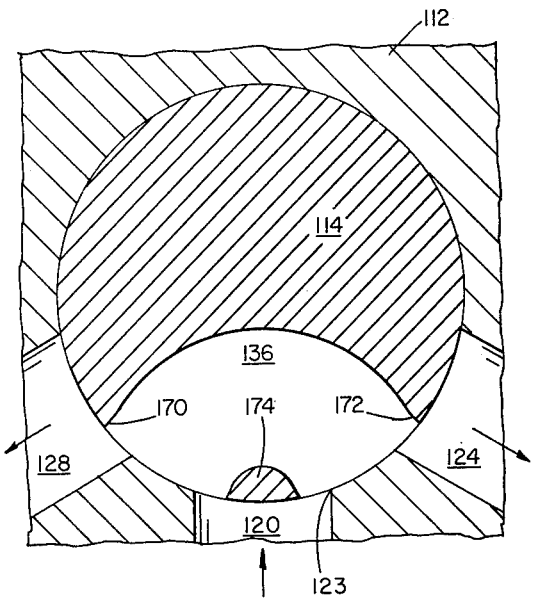
FIG 19a   FIG 20a
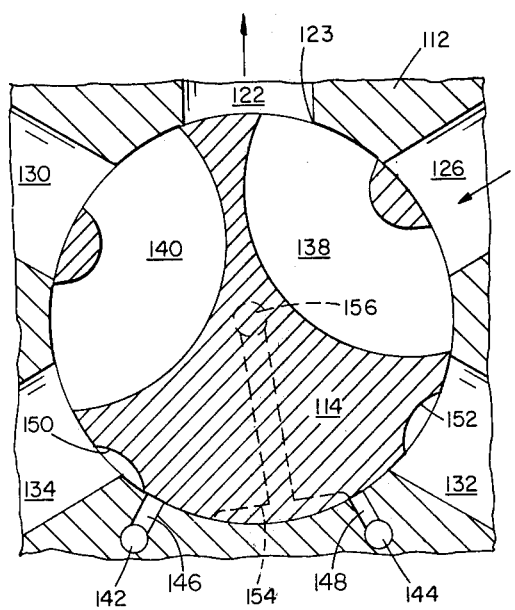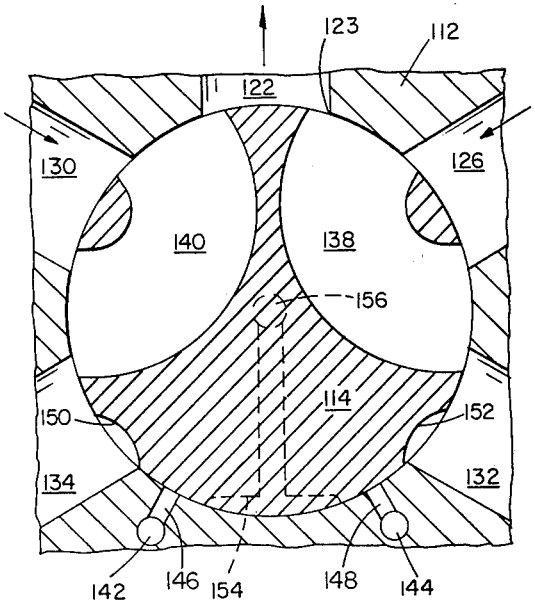
FIG 19b   FIG 20b

FILTER CHANGING VALVE UNIT

This is a continuation-in-part application of our application Ser. No. 326,019 filed Jan. 23, 1973 now abandoned.

In the operation of extrusion apparatus, a viscous liquid, for example, an organic plastic material, is supplied from a source to a die. It is generally necessary to filter this liquid between the source and die, and the filter after a period of use becomes dirty and must be removed for cleaning. It is desirable to avoid shutting down the operation of the extrusion apparatus in order to clean the filter; to accomplish this, alternate filters are provided, and flow is directed through a first filter until it requires cleaning, whereupon flow is diverted to the second filter while the first is removed and cleaned. The filters are alternated in use.

However, even skilled operators of the extrusion apparatus are seldom able to accomplish the alternation from one filter to the next without any change in the rate or quantity of flow of liquid to the die, or inclusion of air in the flow. Therefore the ultimate product, such as, for example, a sheet film or a multiplicity of fibers may have variations in thickness or may break because of variations in the flow of liquid from which the product is formed.

It is therefore an object of the present invention to provide a valve for use in such extrusion apparatus that will permit two filter elements to be alternated in use while maintaining at all times a constant flow of liquid to the die. This is accomplished by providing a valve that presents no restriction to the flow at the source end of its inlet passage, but that provides an available flow passage throughout the valve that has a hydraulic flow radius that is everywhere at least as great as that at the source end of the inlet passage.

It is also an object of the invention to provide means for completely filling and purging all air from the second filter before cutting off flow from the first filter, thus avoiding any interruption or decrease in the flow to the die, or any inclusion of air in the flow, when the first filter is taken off line.

In one aspect of the invention, there is provided, in combination with extrusion apparatus having a liquid source, a die and alternate filter means, a plug valve unit comprising a valve housing, plug means seated in the housing, and control means. The valve housing has a first filter outlet passage to the first filter means and first return passage from the first filter means, and a second filter outlet passage to the second filter means and second return passage from the second filter means; the housing further has source inlet passage from the source and a die outlet passage to the die. The valve housing has at least one bore defining internal housing surfaces, and the housing passages have spaced openings in the internal housing surfaces. The plug element means provides inlet through passage means for connecting the source inlet passage to a filter outlet passage, and outlet through passage means for connecting a return passage to the die outlet passage. More specifically, the plug means comprises at least one plug element rotatably mounted within a housing bore and having external surfaces of revolution cooperating with the internal housing surfaces. The plug through passage means at their opposite ends have spaced openings in the plug element surfaces. Each housing bore has at least three spaced openings in its internal housing surface. The through passage means spaced openings of the plug element mounted in the bore are alternately connectable to selected pairs of the housing passage openings.

The control means moves the plug element means between a position in which the inlet through passage means connects the source inlet passage with the first filter outlet passage and the outlet through passage means connects the first return passage with the die outlet passage, and a position in which the inlet through passage means connects the source inlet passage with the second filter outlet passage and the outlet through passage means connects the second return passage with the die outlet passage.

The source inlet passage cross sectional area increases from the end proximate to the source toward the plug element means, and the die outlet passage cross sectional area decreases from the plug element means toward the end proximate to the die. The through passage means cross sectional area is everywhere greater than that of the source inlet passage proximate end, such that in all operative positions of the plug element means the overlap of the inlet through passage means with the source inlet passage and the overlap of the outlet through passage means with the die outlet passage provide an available flow passage of hydraulic flow radius everywhere at least about equal to that of the source inlet passage end proximate to the source.

This structure provides a valve which presents no restriction to the flow of liquid through it from source to die, in any operative position of the valve.

In another aspect of the invention, there is provided a novel interconnected double plug valve, and the plug element means comprises inlet and outlet plug elements seated in the housing, each plug element having a flow passage therethrough. The valve control means, which includes connecting means between the two plug elements, initially rotates the inlet plug element to a filling position in which initial flow passage means in that plug connects the source inlet passage with the second filter outlet passage, without rotating the outlet plug element. In this filling position, vent passage means in the outlet plug element communicates with the second return passage. Thereafter the control means rotates both plug elements at different rates and completes the rotation of both simultaneously. The vent passage means is removed from communication with the second return passage by rotation of the outlet plug element from its initial position. Flow to the second filter means is thereby begun and the second filter means is filled before flow from the first filter means is cut off, and continuous flow from source to die is maintained without inclusion of air throughout the operation of the valve.

In still another aspect of the invention there is provided a novel plug valve, preferably with a single plug. The valve housing further provides first and second cleanout passages communicating with the first and second filter means respectively, the second cleanout passage being connected with the second return passage when the plug means is in its initial position, and the first cleanout passage being connected with the first return passage when the plug means is in its final position.

The housing and plug means further provide cooperative vent passage means communicating with the exterior of the valve, and the plug means further provides initial flow passage means. The control means initially rotates the plug means to a filling position in which the initial flow passage means connects the source inlet passage with the second return passage and the vent passage means communicates with the second cleanout passage. The vent passage means is removed from communication with the second cleanout passage by further rotation of the plug means out of the filling position. Flow to the second filter means is thereby begun and the second filter means is filled and deaerated before flow from the first filter means is cut off, and continuous flow from source to die is maintained without inclusion of air throughout operation of the valve.

Other objects, features and advantages will appear from the following description of preferred embodiments of the invention, taken together with the attached drawings thereof, in which:

FIG. 10 is a detail view of the source inlet passage and a portion of the housing;

FIGS. 10a through 10d are schematic views showing the overlap of various passages of the valve at various times during its operation;

FIG. 11 is an elevation of a single-plug embodiment of the invention together with filter means;

FIG. 12 is taken on line 12—12 of FIG. 11;

FIG. 13 is a view of the plug and housing of a second embodiment of the invention, the plug being in elevation and the housing in section;

FIG. 14 is taken on the line 14—14 of FIG. 13;

FIG. 15 is a detail view similar to FIG. 10;

FIGS. 15a through 15c are schematic views showing the overlap of various passages of the valve at various times during its operation;

FIGS. 16a through 16c are sectional views of the passages whose overlap is shown in FIGS. 15a through 15c; and FIGS. 17a and 17b through 24a and 24b show the inlet and outlet passage means of the plug with portions of the housing during various stages in the operation of the second embodiment of the invention;

FIGS. 25 through 31 are schematic views showing, for a second double-plug embodiment, the relationships of the plug elements and housing at various times during the operation of the valve.

Figure 1:
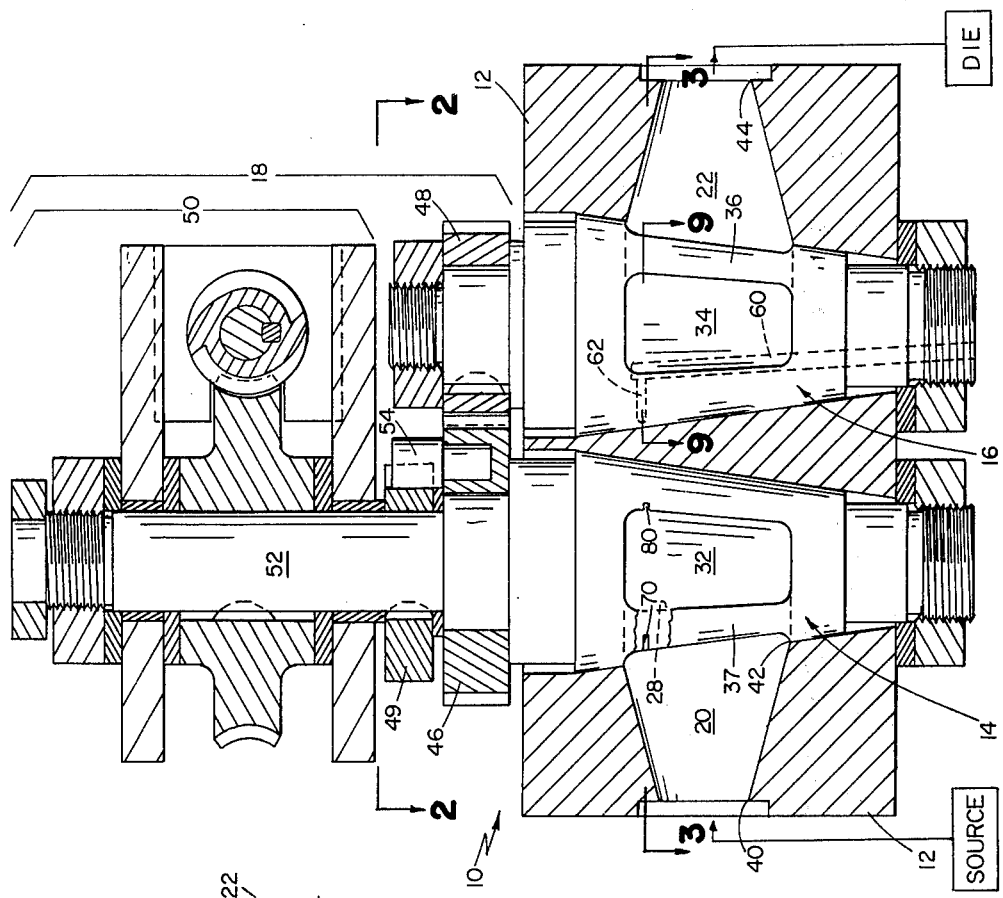
FIG. 1 is a view of a double-plug embodiment of the invention, with the housing and part of the control means shown in section.
Figure 3:
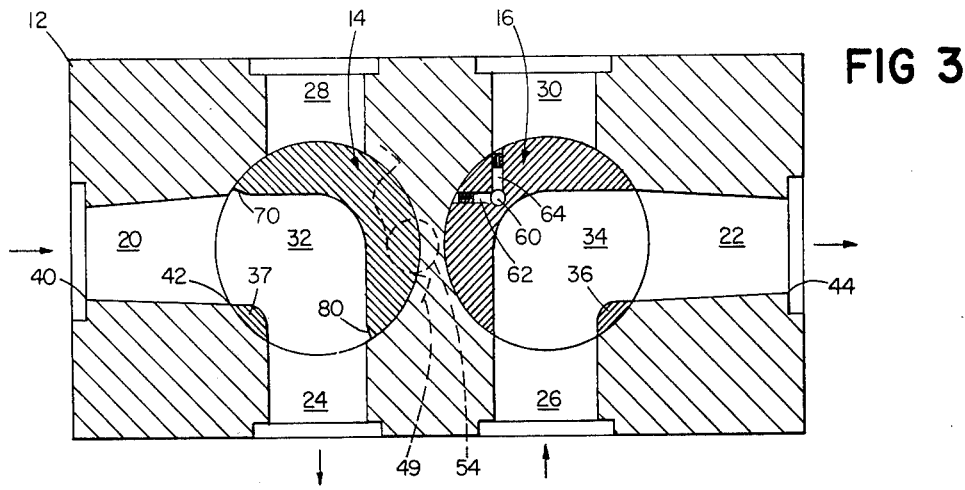
FIGS. 3 through 8 are schematic views showing the relationships of the plug elements and housing at various times during the operation of the valve.

Referring to the drawings, FIG. 1 shows a first embodiment of the present invention. The valve unit, designated generally at 10, comprises a valve housing 12, an inlet plug element 14 and an outlet plug element 16, and control means generally designated at 18. Housing 12 provides a source inlet passage 20 and a die outlet passage 22. As seen in FIG. 3, housing 12 further provides a first filter outlet passage 24 leading to a first filter (not shown) and a first return passage 26 returning from the first filter, and a second filter outlet passage 28 leading to a second filter (not shown) and a second return passage 30 returning from the second filter.

Inlet valve plug element 14 provides inlet through passage means in the form of passage 32, and outlet valve plug element 16 provides outlet through passage means in the form of passage 34. Filter outlet passages 24 and 28 are schematically placed within housing 12 with respect to source inlet passage 20 and generally co-planar therewith, so that the single through passage 32 can connect source inlet passage 20 either with first filter outlet passage 24 or (after plug 14 is rotated about its long axis) with second filter outlet passage 28. Filter return passages 26 and 30 are similarly symmetrically placed with respect to die outlet passage 22 and generally co-planar therewith.

As seen in FIGS. 10 and 10a, source inlet passage 20 has a circular cross section at end 40 proximate to the source. The "hydraulic flow radius" at the inlet orifice is defined as the total area at end 40 of source inlet passage 20 divided by the perimeter at the same point. Source inlet passage 20 enlarges to a rectangular (or other configuration) cross section of greater area at end 42 at the interface of housing 12 and plug element 14. Through passage 32 has a matching rectangular cross section. Similarly, at the die end of the valve, die outlet passage 22 has a rectangular (or other configuration) cross section at the interface of plug element 16 and housing 12 and decreases to a circular cross section at end 44 proximate to the die; this circular cross section is at least as large as that at end 40 and the hydraulic flow radius at end 44 is at least equal to that at end 40 of passage 20.

Figure 9:
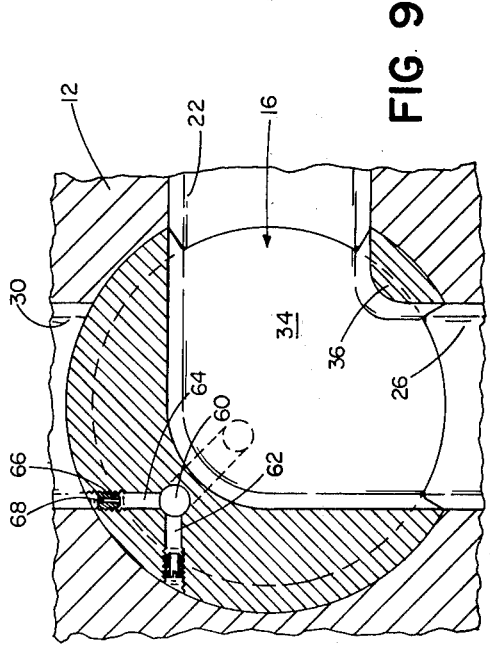
FIG. 9 is taken on line 9—9 of FIG. 1.

The inner curve of through passage 34 in outlet plug element 16 defines a land 36, as seen in FIGS. 3–6. The size of plug 16 is related to the size of through passage 34 (and of passages 30, 26, and 22 at the plug housing interface) such that the arcuate width of land 36 is about one-half the arcuate width of passage 34 at the plug-housing interface. Diagonally opposite to land 36 is a vent hole 60, as best seen in FIGS. 1 and 9, extending downwardly through the body of plug element 16 to the exterior of plug unit 10 and communicating with the atmosphere. Two plug passages 62 and 64 extend at right angles to vent hole 60 and to each other, and each accommodates a vent plug 66 providing an aperture 68. Vent plugs 66 are removable and interchangeable with others to provide a suitably sized aperture 68 for the particular flow conditions in which the valve is used.

Through passage 32 in inlet plug element 14 provides initial flow passage means in the form of a bleed-off slit 70, as seen in FIG. 3, and the inner curve of through passage 32 defines a land 37, whose arcuate width is about one-half the arcuate width of through passage 32 at the plug-housing interface.

Figure 2:
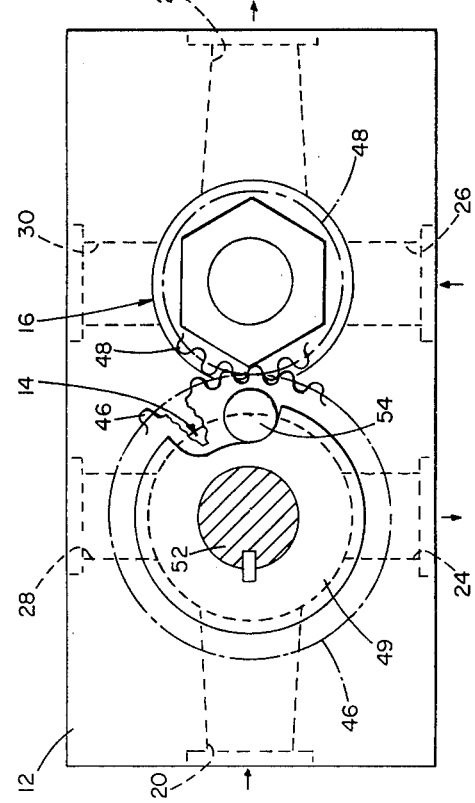
FIG. 2 is taken on line 2—2 of FIG. 1.

Control means 18 includes a worm wheel drive assembly 50 which is connected through shaft 52 to inlet valve plug element 14. Cam 49 is rotated by shaft 52 and engages cam follower 54, as best seen in FIG. 2, which is connected to driving gear 46. Gear 46 engages driven gear 48, which is of smaller diameter than gear 46 and is connected to outlet valve plug element 16. This arrangement provides for an interconnected lost motion rotation of the two plug elements such that inlet plug element 14 begins to rotate first, and completes a portion of its rotation before cam 49 engages cam follower 54, causing driving gear 46 to engage driven gear 48 to initiate motion of outlet plug element 16.

In operation, a first filter, not shown, is initially on line (FIG. 3). At this time, plug elements 14 and 16 are so oriented that source inlet passage 20 is connected by through passage 32 to first filter outlet passage 24, and first return passage 26 is connected by through passage 34 to die outlet passage 22. In this condition, as seen in FIG. 10a, through passage 32 exactly registers with source inlet passage 20 and with first filter outlet passage 24. The same conditions obtain at the outlet plug element, first return passage and die outlet passage. Thus, the available flow passage within valve unit 10 is everywhere greater than the flow passage at end 40 of source inlet passage 20, so that valve unit 10 presents no restriction to the flow of fluid through it.

Figure 4:
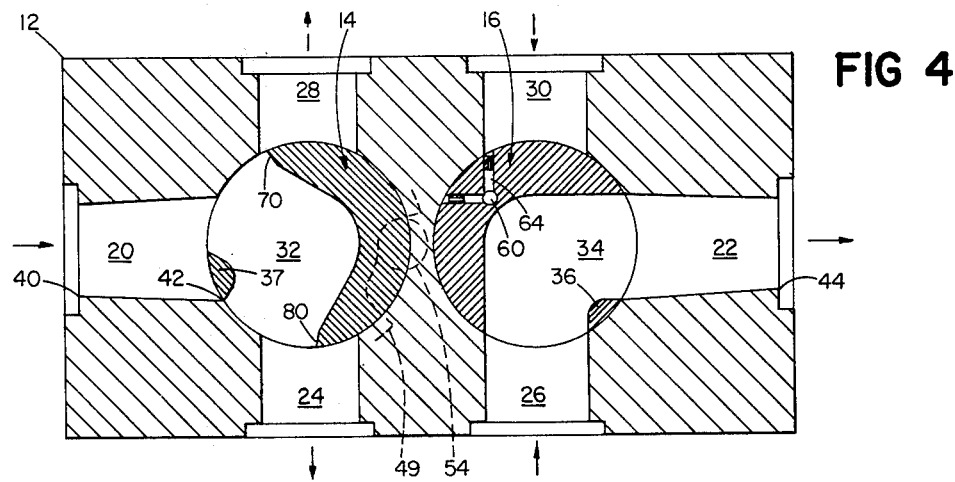

As shaft 52 is rotated by drive assembly 50, inlet valve plug element 14 is rotated, as seen in FIG. 4, to a point at which bleed-off slit 70 just overlaps second filter outlet passage 28, and cam 40 just engages cam follower 54, as shown in phantom. Up to this point, outlet plug valve element 16 does not rotate. Second return passage 30 is vented to the atmosphere through vent plug passage 64 and vent hole 60, permitting flow to the second filter through bleed-off slit 70. Valve unit 10 remains in this position while the second filter is filled and deaerated. As seen in FIG. 10b, land 37 blocks off about one-half of the passage area at the interface of source inlet passage 20 and inlet plug element 14. Nevertheless, the remaining flow passage available at the interface, designated at 72 in FIG. 10b, is at least as great as the area at end 40 of source inlet passage 20. The condition at the interface of through passage 32 and first filter outlet passage 24 is the same; thus no restriction occurs in the flow of fluid through plug element 14.

Figure 5:
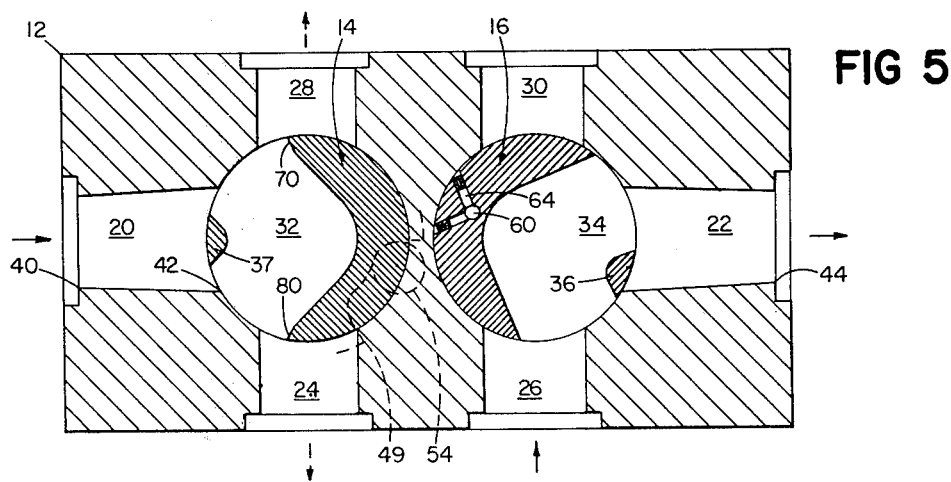
Figure 6:
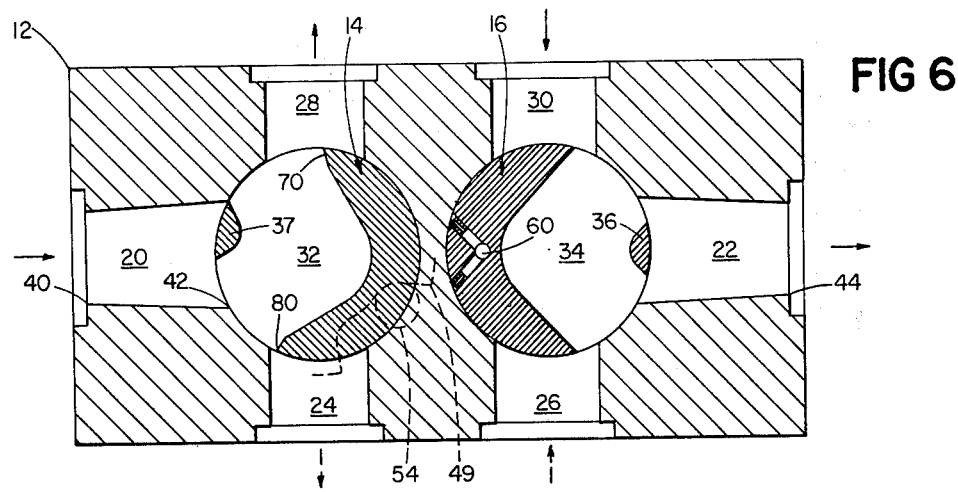
Figure 7:
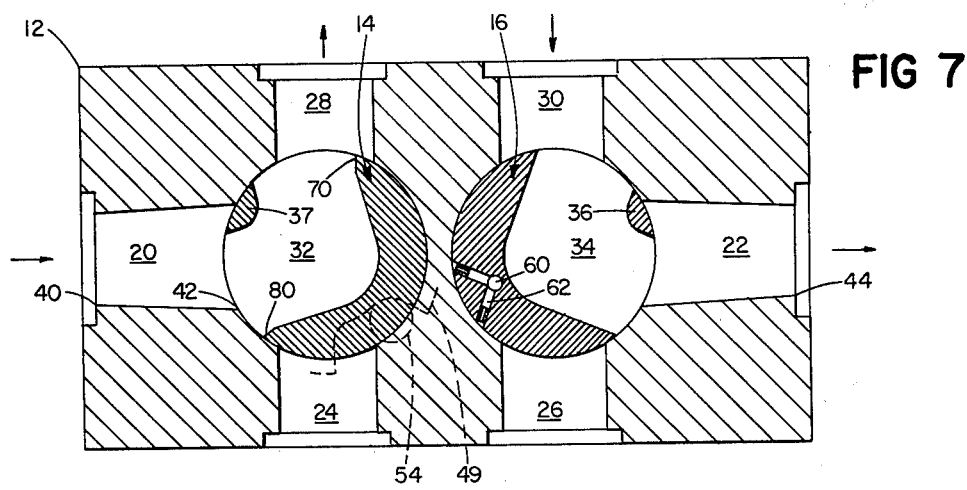
Figure 8:
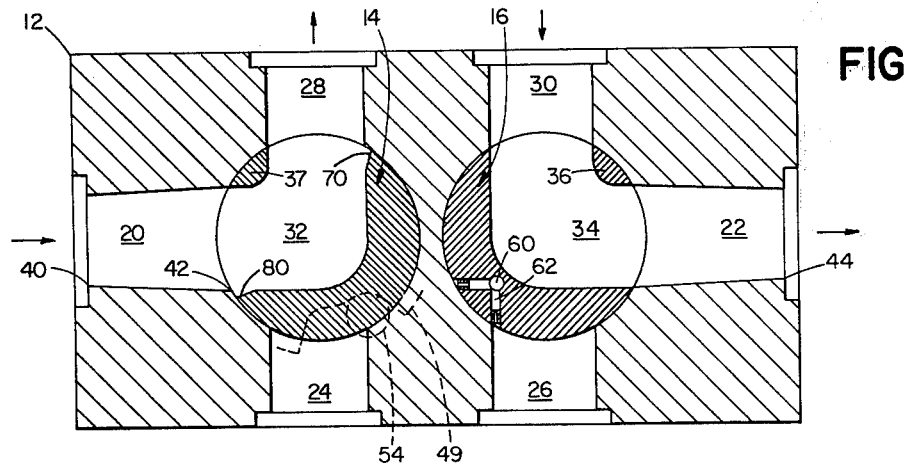
Figure 17A:
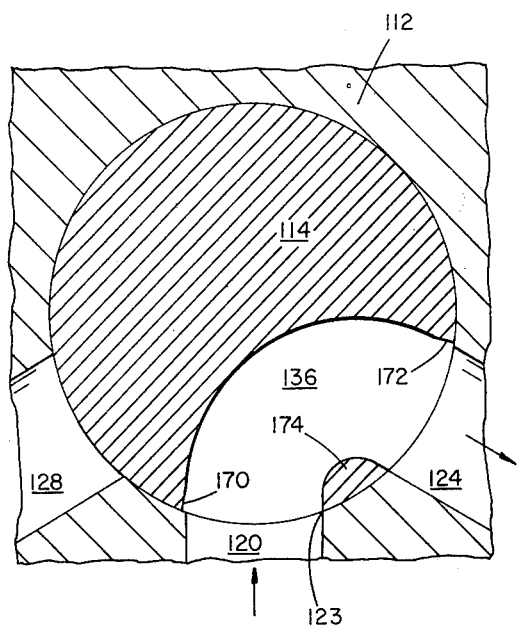
Figure 18A:
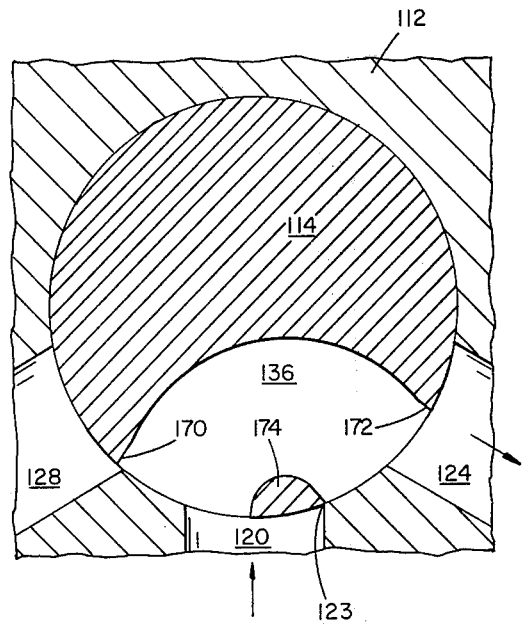
Figure 17B:
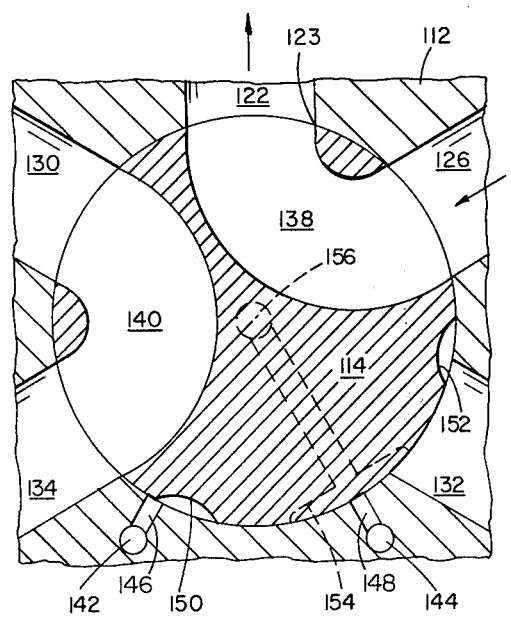
Figure 18B:
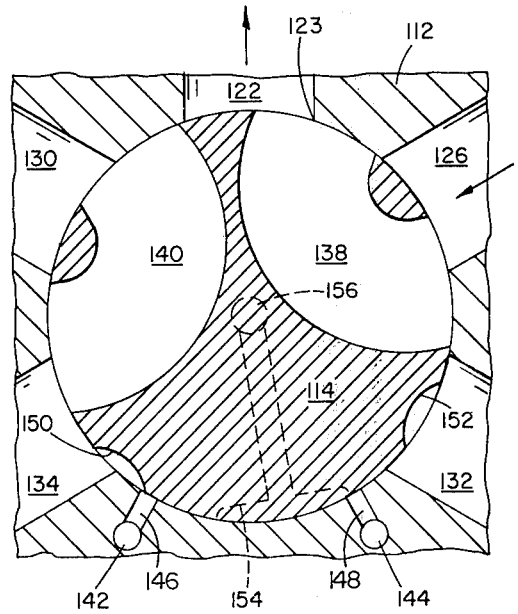
Figure 21A:
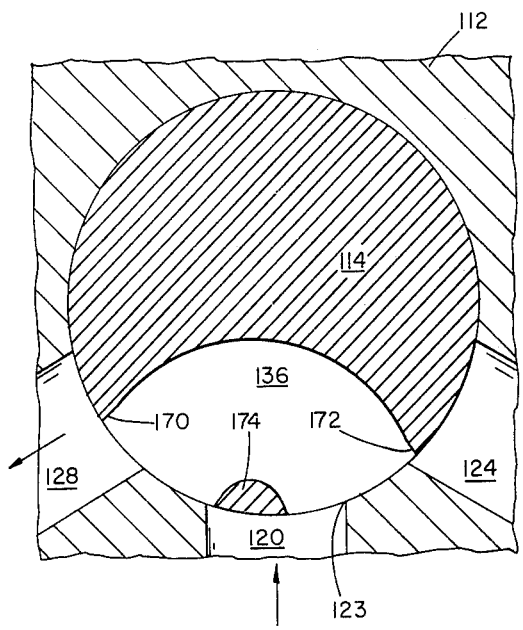
Figure 22A:
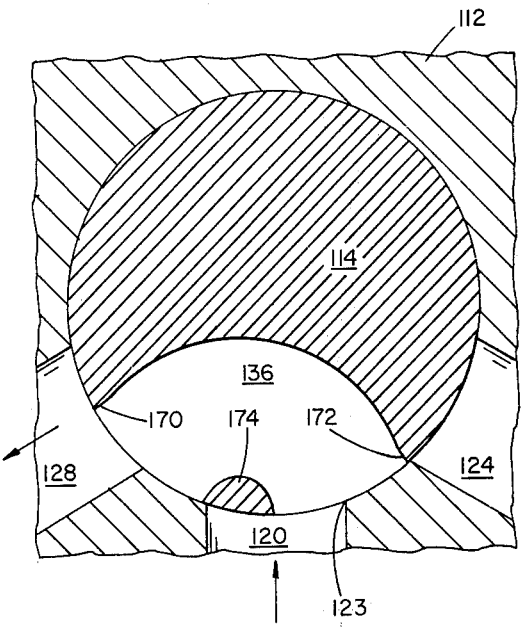
Figure 21B:
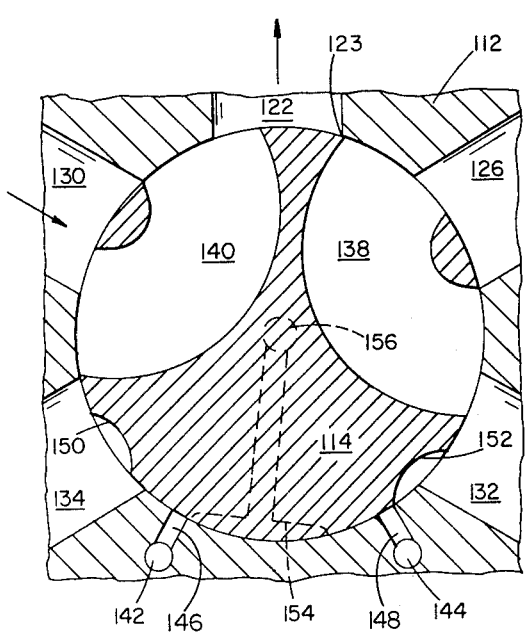
Figure 22B:
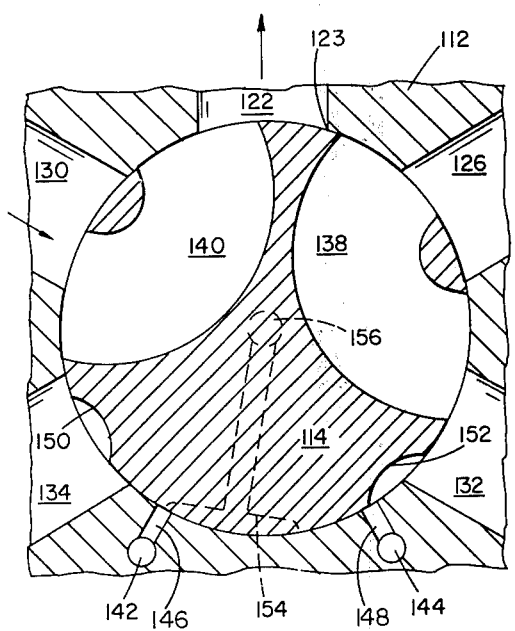
Figure 23A:
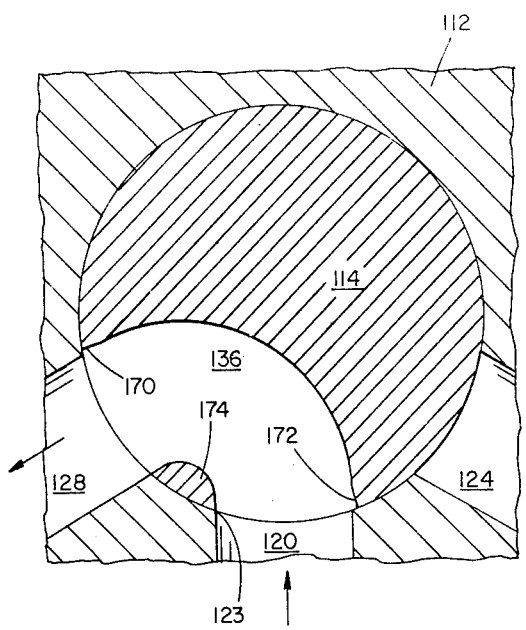
Figure 24A:
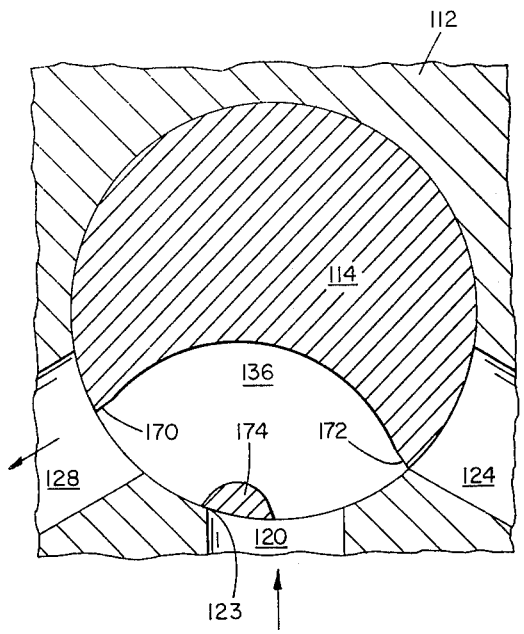
Figure 23B:
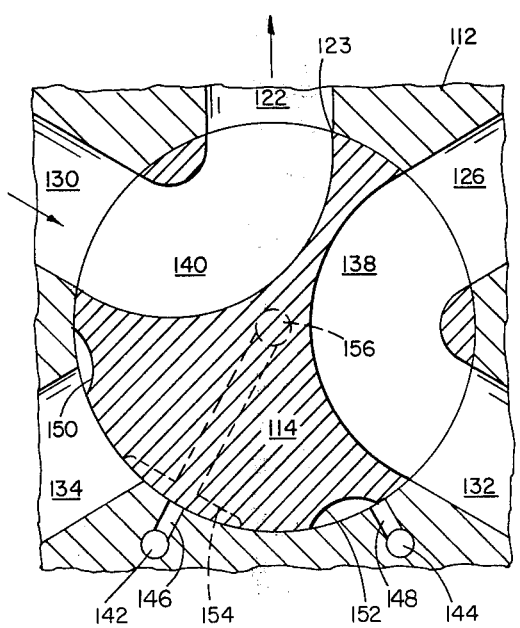
Figure 24B:
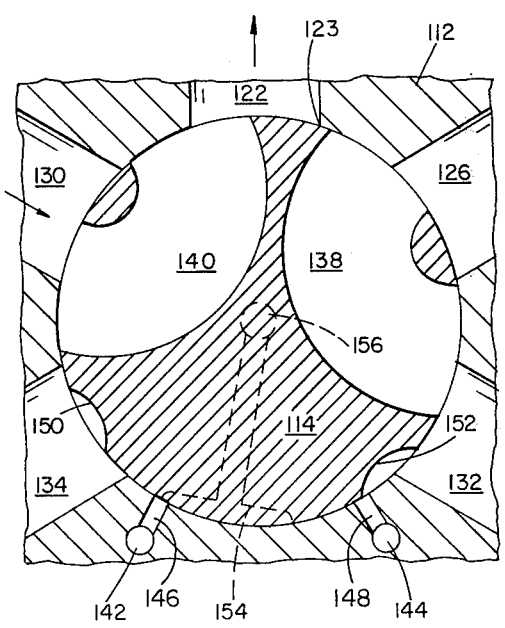

After the second filter has been filled, shaft 52 is further rotated and cam 49 engages cam follower 54, causing rotation of outlet plug element 16 into the position of FIG. 5, in which vent plug passage 64 has moved out of contact with return passage 30. The second filter is still off-line but is now being pressurized. Further rotation moves plugs 14 and 16 into the final position of FIG. 8, in which the second filter is on-line while the first is off-line and vented to atmosphere, permitting it to be removed for cleaning. In the position shown in FIG. 5, both ends of through passage 32 overlap source inlet passage 20, separated by land 37, providing two available flow areas 74 and 76 whose total area is at least as great as that of end 40 of source inlet passage 20 (FIG. 10c). At the same time, one end of passage 32 overlaps first filter outlet passage 24, providing an available flow passage 78 that is also at least as great as that of end 40 (FIG. 10d). It will be seen from FIGS. 5 through 8 that in all positions of plug elements 14 and 16 this condition on the available flow passage is met throughout valve unit 10; that is, the hydraulic flow radius is everywhere at least as great as the hydraulic flow radius at the inlet orifice 40, in all operative positions of the valve.

By reversing the rotation of shaft 52 the second filter can be taken off line and the first filter put on line. During this reverse process, plug element 14 is rotated to the point at which bleed-off slit 80 just overlaps first filter outlet passage 24 and the first filter is filled while the valve is in this position. The operation otherwise is similar to that already described.

Referring now to FIGS. 11 through 24, in a second embodiment of the invention the valve unit, designated generally at 110, provides a housing 112, in which is seated a plug element 114, and control means generally designated at 118. Housing 112 provides a source inlet passage 120 and a die outlet passage 122. In addition, as seen in FIG. 14, housing 112 provides a first filter outlet passage 124 to the first filter means 125 and a first return passage 125 therefrom, and a second filter outlet passage 128 to the second filter means 129 and a second return passage 130 therefrom. Additionally, housing 112 provides first cleanout passage 132 and second cleanout passage 134.

Return passages 126 and 130, cleanout passages 132 and 134, and the plug interface end 123 of die outlet passage 122 are spaced axially from filter outlet passages 124 and 128 and source inlet passage 120 within housing 112.

Valve plug element 114 provides inlet through passage means in the form of passage 136 and outlet through passage means in the form of first and second outlet through passages 138 and 140. Passages 138 and 140 are axially spaced from passage 136 within plug 114.

Filter outlet passages 124 and 128 are symmetrically placed within housing 112 with respect to source inlet passage 120 and generally co-planar therewith, so that through passage 136 in plug 114 can connect source inlet passage 120 either with first filter outlet passage 124 or with second filter outlet passage 123. Similarly, return passages 126 and 130 are symmetrically placed with respect to die outlet passage 122 and generally co-planar therewith, as are cleanout passages 132 and 134. Thus, if through passage 140 initially connects passages 134 and 130, and through passage 138 connects passages 126 and 122, one simple rotation of plug 114 about its long axis will change the valve condition to that in which through passage 140 connects passages 130 and 122, and through passage 138 connects passages 132 and 126.

As seen in FIGS. 15 and 15a, source inlet passage 120 has a circular cross section at end 141 proximate to the source, enlarging to a rectangular (or other configuration) cross section of greater area at end 143 at the interface of housing 112 and plug element 114. Through passage 136 has a matching rectangular (or other) cross section. Similarly, at the die end of the valve, die outlet passage 122 has a rectangular (or other) cross section at the interface of plug element 114 and housing 112 and decreases to a circular cross section at end 145 proximate to the die; this circular cross section is at least as large as that at end 141.

Through passage 136 in plug element 114 provides initial flow passage means in the form of bleed off slits 170 and 172, and the inner curve of through passage 136 defines a land 174. Housing 112 provides vent holes 142 and 144 which extend downwardly through housing 112 and are connected by vent passages 146 and 148 extending at right angles from the vent holes to the interface of housing 112 and plug element 114. Vent slits 150 and 152 are provided in plug element 114, and one or the other may communicate with one of vent holes 150 and 152 as plug element 114 is rotated, as will appear more fully in what follows. Depressurization slot 154 communicates with the atmosphere by means of axial passage 156 and may be brought into communication with either of cleanout passages 132 and 134.

In operation (FIGS. 16 through 24), first filter means 125 is initially on line (FIG. 17). At this time, plug 114 is oriented so that source inlet passage 120 is connected by through passage 136 to first filter outlet passage 124, and first return passage 126 is connected by first through outlet passage 138 to die outlet passage 122. Second through outlet passage 140 connects second return passage 130 with second cleanout passage 131, providing access for complete cleanout of the off-line passages. Second cleanout passage 132 is vented to atmosphere through depressurization slot 154.

As plug element 114 is rotated by control means 118 (FIG. 18), inlet through passage 136 is moved to a position in which bleed-off slit 170 just overlaps second filter outlet passage 128. Second cleanout passage 134 is vented to atmosphere by vent slit 150 which communicates with vent hole 142. In these conditions, second filter means 129 begins to fill while flow is maintained through first filter means 125. When second filter means 129 has been filled and completely deaerated, further rotation of plug element 114 (FIG. 19) moves vent slit 150 past vent hole 142. Second filter means 129 is still off-line but is now being pressurized. In mid-position (FIG. 20), there is equal flow through first filter means 125 and second filter means 129.

Further rotation of plug element 114 (FIG. 21) moves through outlet passage 138 out of communication with die outlet passage 123, taking first filter means 125 off-line. Still further rotation (FIG. 22) brings vent slit 152 into bridging relation between cleanout passage 132 and vent hole 144, permitting first filter means 125 to be depressurized, prior to disassembly and cleaning. In the final position (FIG. 23) second filter means 129 is on-line and first filter means 125 is off-line. When it is desired to clean second filter means 129 the process is reversed. Plug 114 is rotated (FIG. 24) until bleed-off slit 172 just overlaps first filter outlet passage 124. First cleanout passage 132 is vented to atmosphere through vent slit 152 and vent hole 144. When first filter means 125 has been filled, plug 114 is rotated further to complete the disconnection and depressurization of second filter means 129 and the placing of first filter means 125 on-line.

When first filter means 125 is on-line, as seen in FIGS. 16a and 17, through passage 136 exactly registers with source inlet passage 120 and with first filter outlet passage 124. The same conditions obtain at through passage 138, first return passage 126 and die outlet passage 122. Thus, the hydraulic flow radius within valve unit 110 is everywhere at least as great as that at end 141 of source inlet passage 120, so that valve unit 110 presents no restriction to the flow of fluid through it.

In the filling position (FIGS. 15b and 16b), land 174 blocks off about one-half of the passage area at the interface of source inlet passage 120 and plug element 114. Nevertheless, the remaining flow passage available at the interface, designated at 180 in FIG. 15b, is at least as great as the area at end 141 of source inlet passage 120. The condition at the interface of through passage 136 and first filter outlet passage 124 is the same; thus no restriction occurs in the flow of fluid through plug element 114 to first filter means 125. The same conditions obtain at the filter return and die outlet passages.

In the position shown in FIGS. 16c and 15c, both ends of through passage 136 overlap source inlet passage 120, separated by land 174, providing two available flow areas 182 and 184 whose total area is at least as great as that of end 141 of source inlet passage 120 (FIG. 15c). It will thus be seen from FIGS. 17 through 24 that in all positions of plug element 114 the hydraulic flow radius is everywhere at least as great as it is at inlet orifice 141.

FIGS. 25 through 31 show a third embodiment of the invention, which is a variation of the double-plug embodiment previously described, and shown in FIGS. 1 through 10. Unlike the double-plug embodiment previously shown and described, the two plug elements of the third embodiment are rotated simultaneously throughout and at the same speed, rather than with the lost-motion rotation of the first described double-plug embodiment.

Figure 25:
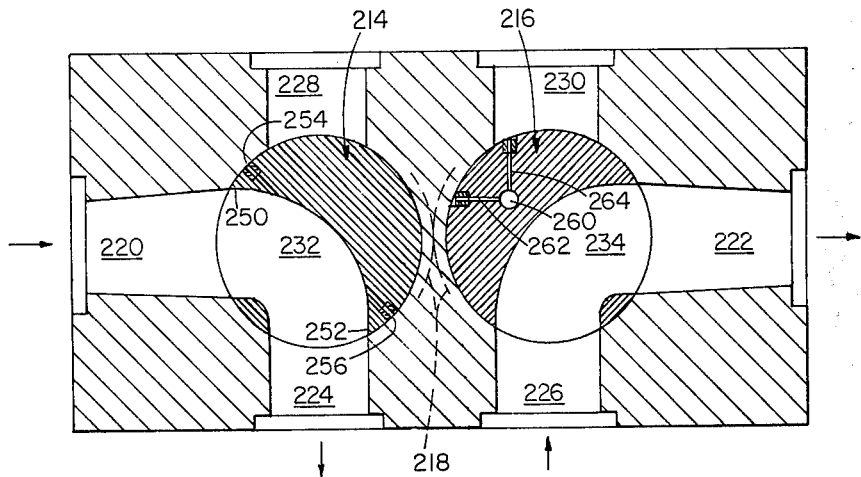

As seen in FIG. 25, the valve unit, designated generally at 210, comprises a valve housing 212, an inlet plug element 214 and an outlet plug element 216, and control means including gears as indicated in phantom at 218. Housing 212 provides a source inlet passage 220 and a die outlet passage 222, a first filter outlet passage 224 leading to a first filter (not shown) and a first return passage 226 returning from the first filter, and a second filter outlet passage 228 leading to a second filter (not shown) and a second return passage 230 returning from the second filter.

Inlet valve plug element 214 provides inlet through passage means in the form of passage 232, and outlet valve plug element 216 provides outlet through passage means in the form of passage 234. As in the first double-plug embodiment, filter outlet passages 224 and 228 are symmetrically placed within housing 212 with respect to source inlet passage 220 and generally co-planar therewith, so that the single through passage 232 can connect source inlet passage 220 either with first filter outlet passage 224 or (after plug 214 is rotated about its long axis) with second filter outlet passage 228. Filter return passages 226 and 230 are similarly symmetrically placed with respect to die outlet passage 222 and generally co-planar therewith.

The details of the cross sections of the passages and the lands formed between the inner curves of the passages and the plug surface are not significantly different from those previously described for the first double-plug embodiment, and the available flow areas are similar to those shown for that embodiment with reference to FIGS. 10 and 10a through d, and will not be separately described here.

Inlet through passage 232 includes leading edge portions 250 and 252; as the plug element is rotated as shown in FIGS. 25 through 31, edge portion 250 is the first part of passage 232 to reach second filter outlet passage 228. When the plug is rotated in the opposite sense to that shown in the FIGS., leading edge portion 252 is the first part of passage 232 to reach first filter outlet passage 224. Adjacent leading edge 250 is an initial flow passage 254, so positioned as to reach passage 228 ahead of leading edge 250 when the plug element is rotated in the sense in the FIGS. Similarly, an initial flow passage 256 is positioned adjacent leading edge 252 so as to reach passage 224 ahead of edge 252 when the plug element is rotated in the opposite sense.

Outlet plug element 216 provides two vent passages 262 and 264 similar to those shown in the earlier double-plug embodiment, but positioned more centrally within the plug element. These vent passages communicate with vent hole 260 as previously described.

Figure 26:
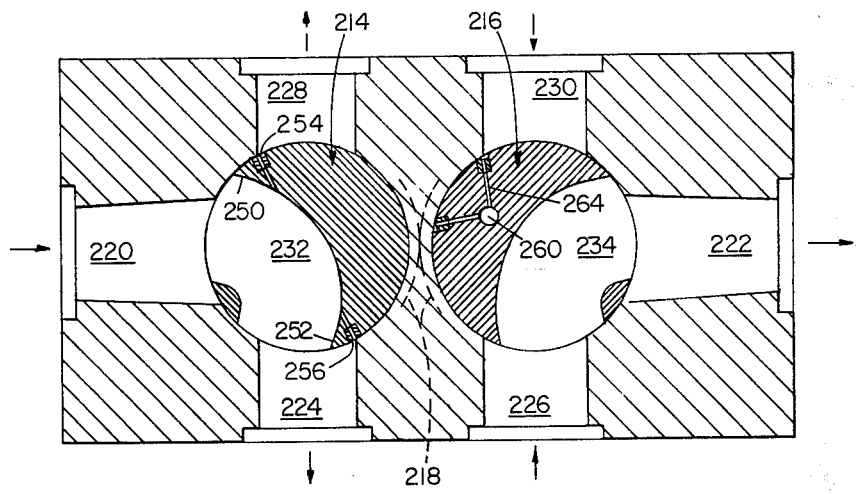
Figure 27:
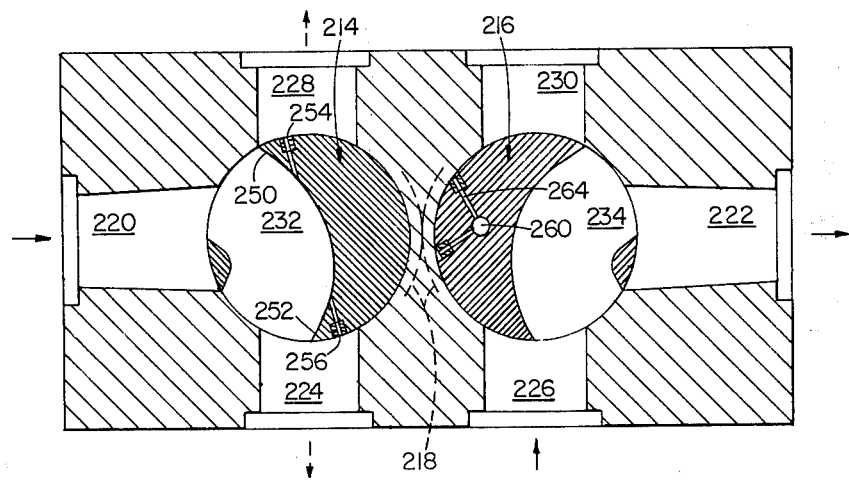
Figure 28:
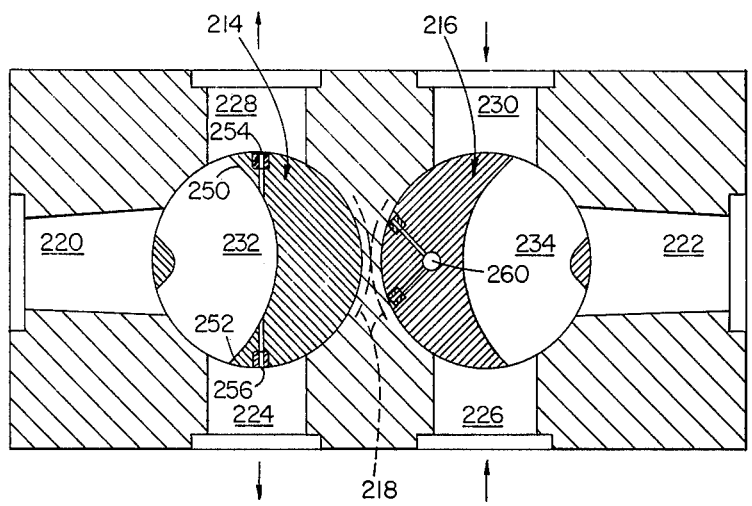
Figure 29:
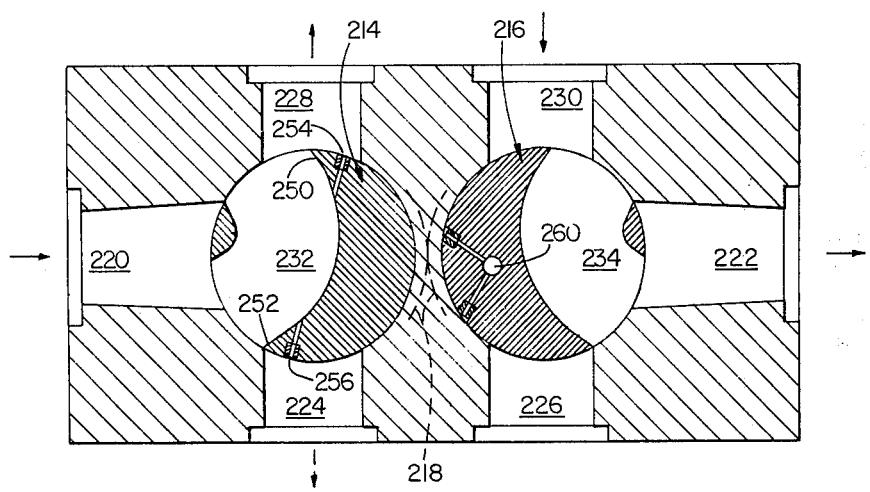
Figure 30:
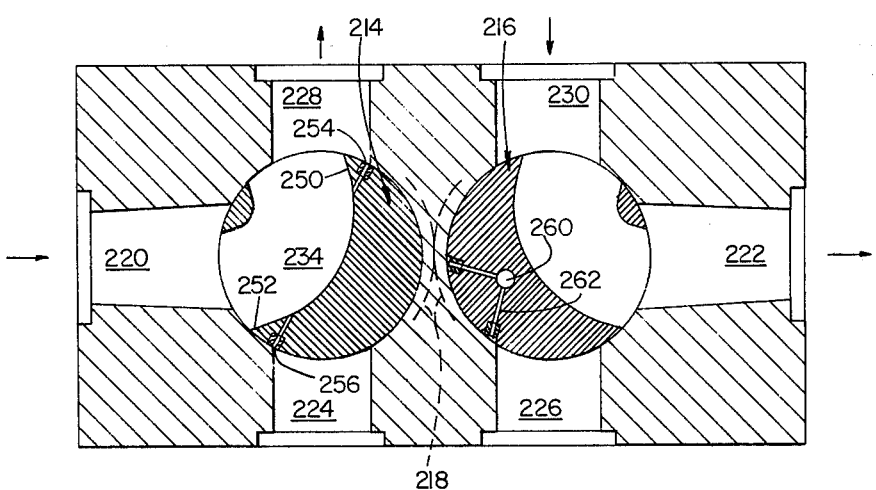
Figure 31:
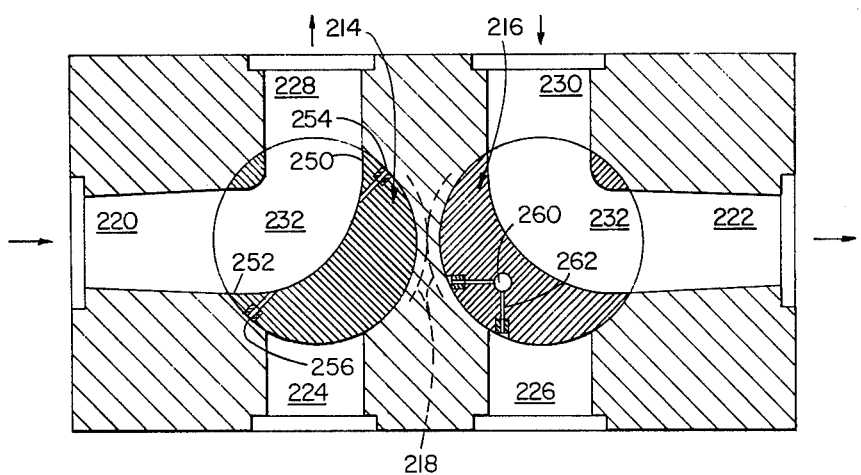

As shown in the sequence of FIGS. 25 through 31, the first filter is initially on-line (FIG. 25). The second filter is vented to atmosphere. Both plug elements are then rotated simultaneously and at equal speeds, and (as seen in FIG. 26) initial adjustable prefill orifice 254 reaches second filter outlet passage 228 to begin prefilling of the second filter while the vent passage 264 is rotated but still in communication with second return passage 230 (FIG. 26) to allow for purging of air initially contained in second filter. As seen in FIG. 27, further filling and simultaneous prepressurization of the second filter continues while full flow is maintained through the first filter; leading edge 250 of inlet through passage 232 has just reached second filter outlet passage 228. In the position shown in FIG. 28, flow through the two filters is equal. Further rotation (FIG. 29) moves outlet through passage out of communication with the first filter; thus the flow to the die is now altogether through the second filter. Further rotation (FIG. 30) brings the plug elements to the final position (FIG. 31) in which the first filter is vented to atmosphere and is altogether off-line, for cleaning and changing of the filter.

What is claimed is:

1. In combination with extrusion apparatus having a liquid source, a die and alternate filter means, a plug valve unit comprising a valve housing having
   a first filter outlet passage to the first filter means and first return passage from the first filter means
   a second filter outlet passage to the second filter means and second return passage from the second filter means
   a source inlet passage from the source
   a die outlet passage to the die
said valve housing having at least one bore defining internal housing surfaces, said passages having spaced openings in said housing surfaces
plug means seated in said housing providing
   inlet through passage means for connecting said source inlet passage to a said filter outlet passage and
   outlet through passage means for connecting a said return passage to said die outlet passage
said plug means comprising at least one plug element rotatably mounted within said housing bore and having external surfaces of revolution cooperating with said internal housing surfaces
said through passage means at their opposite ends having spaced openings in said plug element surfaces
each said housing bore having at least three said spaced openings in its said internal housing surface,
the said through passage means spaced openings of the said plug element mounted in said bore being alternately connectable to selected pairs of said housing passage openings
and control means for moving said plug means between a first position in which said inlet through passage means connects said source inlet passage with said first filter outlet passage and said outlet through passage means connects said first return passage with said die outlet passage, and a second position in which said inlet through passage means connects said source inlet passage with said second filter outlet passage and said outlet through passage means connects said second return passage with said die outlet passage,
said source inlet passage cross sectional area increasing from the end proximate to said source toward said plug means, and said die outlet passage cross sectional area decreasing from said plug means toward the end proximate to said die,
said through passage means having cross sectional area everywhere greater than that of said source inlet passage proximate end and such that in all operative positions of said plug means the overlap of said inlet through passage means with said source inlet passage and the overlap of said outlet through passage means with said die outlet passage provide an available flow passage of hydraulic flow radius everywhere at least about equal to or greater than that of said source inlet passage end proximate to said source.

2. In combination with extrusion apparatus having a liquid source, a die and alternate filter elements, an interconnected double plug valve comprising a valve housing
an inlet plug element and an outlet plug element seated in said housing, each said plug element having a flow passage therethrough, said inlet plug element having initial flow passage means, and said outlet plug element having vent passage means communicating with the exterior of said valve,
said valve housing having
   a first filter outlet passage to the first filter element and first return passage therefrom
   a second filter outlet passage to the second filter element and second return passage therefrom
   a source inlet passage from the source to said inlet plug element
   a die outlet passage from said outlet plug element to the die
said valve housing having two spaced bores defining internal housing surfaces, said passage having spaced openings in said housing surface
said plug elements being rotatably mounted within said housing bores and having external surfaces of revolution cooperating with said internal housing surfaces
said plug flow passages at their opposite ends having spaced openings in said plug element surfaces
each said housing bore having at least three said spaced openings in its internal housing surface,
the said flow passage spaced openings of the said plug element mounted in said bore being alternately connectable to selected pairs of said housing passage openings
and control means including connecting means between said plug elements for rotating said plug elements with respect to said housing
said inlet plug element being rotated between an initial position in which said inlet plug flow passage connects said source inlet passage with said first filter outlet passage and a position in which said inlet plug flow passage connects said source inlet passage with said second filter outlet passage,
said outlet plug element being rotated between an initial position in which said outlet plug flow passage connects said first return passage with said die outlet passage and a final position in which said outlet plug flow passage connects said second return passage with said die outlet passage
said control means initially rotating said inlet plug element to a filling position in which said inlet plug initial flow passage means connects said source inlet passage with said second filter outlet passage, without rotating said outlet plug element,
said outlet plug vent passage means communicating with said second return passage in said filling position of said inlet plug element
said control means thereafter rotating both plug elements at different rates and completing the rotation of both plug elements simultaneously said vent passage means being removed from communication with said second return passage by rotation of said outlet plug element from its said initial position whereby flow to the second filter element is begun and the second filter element is filled and deaerated before flow from the first filter element is cut off, and continuous flow from source to die is maintained without inclusion of air in said flow throughout the operation of the valve.

3. The valve of claim 1, said housing having further first and second cleanout passages communicating with the first and second filter means respectively, said outlet through passage means connecting said second cleanout passage with said second return passage when said plug means is in said first position, and connecting said first cleanout passage with said first return passage when said plug means is in said second position.

4. The valve of claim 3, said housing and said plug means further providing cooperative vent passage means communicating with the exterior of said valve said plug means further providing initial flow passage means said control means initially rotating said plug means to a filling position in which said initial flow passage means connects said source inlet passage with said second return passage and said vent passage means communicates with said second cleanout passage, said vent passage means being removed from communication with said second cleanout passage by further rotation of said plug means out of said filling position whereby flow to the second filter means is begun and the second filter means is filled before flow from the first filter means is cut off, and continuous flow from source to die is maintained without inclusion of air throughout the operation of the valve.

5. The valve of claim 2, said source inlet passage being of cross sectional area increasing from the end proximate to said source toward said inlet plug element said die outlet passage being of cross sectional area decreasing from said outlet plug element toward the end proximate to said die said inlet and outlet plug element flow passages having cross sectional areas everywhere greater than that of said source inlet passage proximate end and such that in all operative positions of said valve the overlap of said source inlet passage with said inlet plug element flow passage and the overlap of said outlet plug element flow passage with said die outlet passage provide an available flow passage of hydraulic flow radius everywhere at least about equal to or greater than that of said source inlet passage end proximate to said source.

6. The valve of claim 2 wherein said inlet plug element flow passage curves through said inlet plug element to define a first land portion included between the two ends of said passage, and said outlet plug element flow passage curves through said outlet plug element to define a second land portion included between the two ends of said passage.

the diameter of said inlet plug element being related to the diameter of said inlet flow passage such that said first land portion has an arcuate width at the interface of said inlet plug element and said housing of approximately one-half the arcuate width of said inlet flow passage at said interface, and the diameter of said outlet plug element being related to the diameter of said outlet flow passage such that said second land portion has an arcuate width at the interface of said outlet plug element and said housing of approximately one-half the arcuate width of said outlet flow passage at said interface.

7. The valve of claim 3 wherein said inlet through passage means comprises an inlet flow passage curving through said plug means to define a first land portion included between the two ends of said passage said outlet through passage means comprises two outlet flow passages, generally co-planar and spaced axially from said inlet flow passage, each said outlet flow passage curving through said plug element to define a second land portion included between the two ends of a said outlet flow passage the diameter of said inlet flow passage being related to the diameter of said plug element such that said first land portion has an arcuate width at the interface of said inlet plug element and said housing of approximately one-half the arcuate width of said inlet flow passage at said interface and the diameter of said outlet flow passages being related to the diameter of said plug element such that each said second land portion has an arcuate width at the interface of said plug element and said housing of approximately one-half the arcuate width of said outlet flow passages at said interface.

8. The valve of claim 4 wherein said inlet through passage means comprises an inlet flow passage curving through said plug element to define a first land portion included between the two ends of said passage said outlet through passage means comprises two outlet flow passages, generally co-planar and spaced axially from said inlet flow passage, each said outlet flow passage curving through said plug element to define a second land portion included between the two ends of a said outlet flow passage the diameter of said inlet flow passage being related to the diameter of said plug element such that said first land portion has an arcuate width at the interface of said inlet plug element and said housing of approximately one-half the arcuate width of said inlet flow passage at said interface and the diameter of said outlet flow passages being related to the diameter of said plug element such that each said second land portion has an arcuate width at the interface of said plug element and said housing of approximately one-half the arcuate width of said outlet flow passages at said interface.

9. In combination with extrusion apparatus having a liquid source, a die and alternate filter means, a plug valve comprising a valve housing plug means seated in said housing, and control means for moving said plug means with respect to said housing said valve housing having a first filter outlet passage to the first filter means and first return passage from the first filter means a second filter outlet passage to the second filter means and second return passage from the second filter means a source inlet passage from the source to said valve plug means a die outlet passage from said valve plug means to the die, and first and second cleanout passages communicating with said first and second filter means respectively said valve housing having at least one bore defining internal housing surfaces, said passages having spaced openings in said housing surfaces said plug means comprising at least one plug element rotatably mounted within said housing bore and having external surfaces of revolution cooperating with said internal housing surfaces said plug means having through inlet passage means for connecting said source inlet passage to a said filter outlet passage through outlet passage means for connecting a said return passage to said die outlet passage, and initial flow passage means, said through passage means at their opposite ends having spaced openings in said plug element surfaces each said housing bore having at least three said spaced openings in its said internal housing surface, the said through passage means spaced openings of the said plug element mounted in said bore being alternately connectable to selected pairs of said housing passage openings said housing and said plug further providing cooperative vent passage means communicating with the exterior of said valve, said control means moving said plug means between an initial position in which said through inlet passage means connects said source inlet passage with said first filter outlet passage and said through outlet passage means connects said first return passage with said die outlet passage, and a final position in which said through inlet passage means connects said source inlet passage with said second filter outlet passage and said through outlet passage means connects said second return passage with said die outlet passage said control means initially rotating said plug means to a filling position in which said initial flow passage means connects said source inlet passage with said second return passage and said vent passage means communicates with said second cleanout passage said vent passage means being removed from communication with said second cleanout passage by further rotation of said plug element means out of said filling position whereby flow to the second filter means is begun and the second filter means is filled and deareated before flow from the first filter means is cut off, and continuous flow from source to die without inclusion of air is maintained throughout the operation of the valve.

10. The valve of claim 1, wherein said plug means comprises an inlet plug element and an outlet plug element said outlet plug element having vent passage means cummunicating with the exterior of said valve for venting the off-line filter in said first and second positions of said plug means, said inlet through passage means in said inlet plug element having a leading edge portion at each end said inlet plug element providing an initial flow passage adjacent each said leading edge portion and communicating with said inlet through passage means inwardly of said leading edge portion for initial filling and pressurizing of the off-line filter means in a position intermediate between said first and second positions of said plug means.

* * * * *

UNITED STATES PATENT AND TRADEMARK OFFICE
CERTIFICATE OF CORRECTION

PATENT NO. : 3,940,222
DATED : February 24, 1976
INVENTOR(S) : Julius Zink

It is certified that error appears in the above-identified patent and that said Letters Patent are hereby corrected as shown below:

Under References Cited, "Hausen" should be --Hansen--;

Under References Cited, "Bereselinck" should be --Beuselinck--;

Column 1, line 52, after "has", insert --a--;

Column 4, line 37, after "Two", insert --vent--;

Column 6, line 68, "131" should be --134--;

Column 7, line 20, "123" should be --122-;

Column 8, line 51, after "sense", insert --shown--;

Column 10, line 38, after "its", insert --said--;

Column 13, line 32, after "plug", insert --means--;

Signed and Sealed this

Sixth Day of July 1976

[SEAL]

Attest:

RUTH C. MASON
*Attesting Officer*

C. MARSHALL DANN
*Commissioner of Patents and Trademarks*